May 28, 1957 — O. J. ST. DENIS — 2,793,770
FIFTH WHEEL WRECKER CRADLE
Filed March 4, 1954 — 3 Sheets-Sheet 1
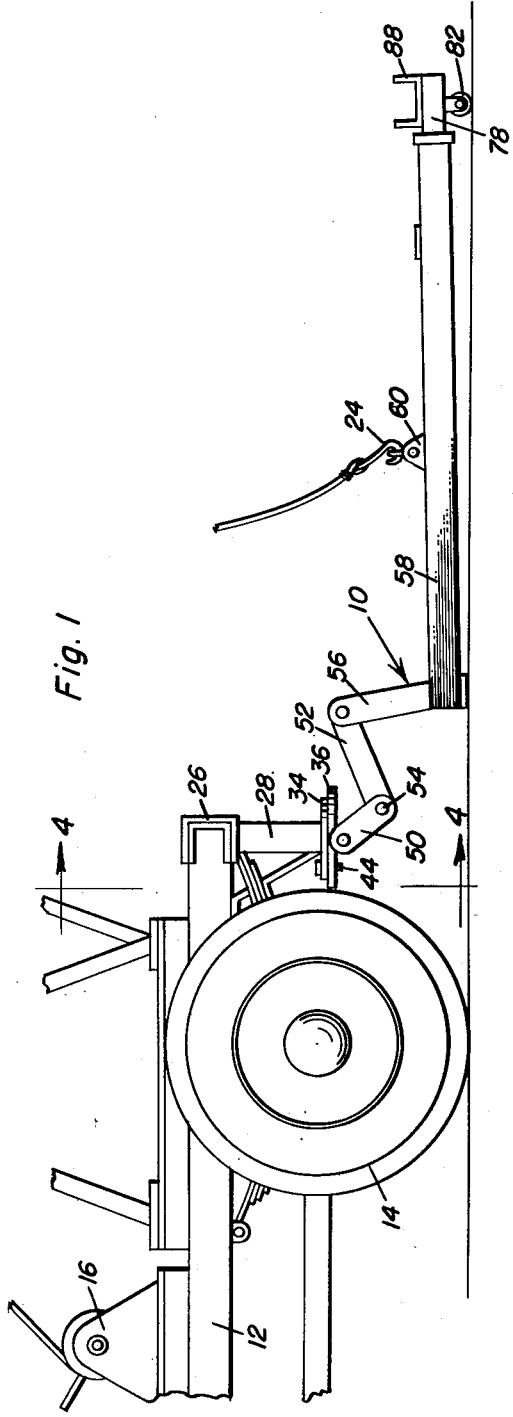
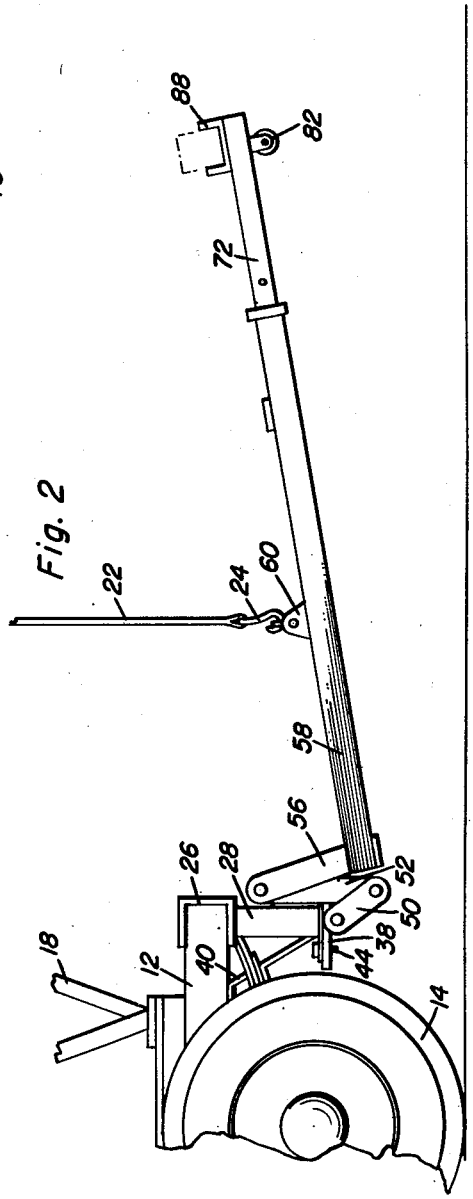
Oliver J. St. Denis
INVENTOR.

May 28, 1957     O. J. ST. DENIS     2,793,770
FIFTH WHEEL WRECKER CRADLE
Filed March 4, 1954     3 Sheets-Sheet 2
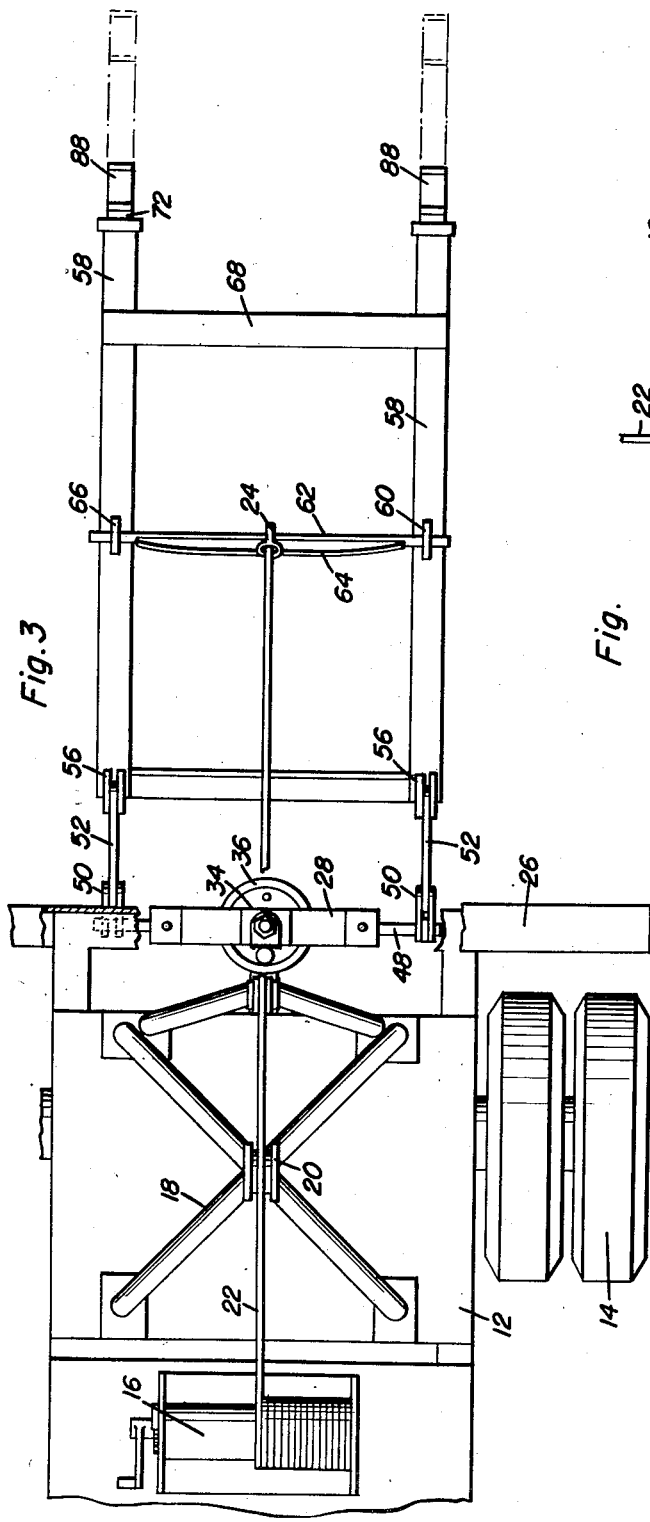
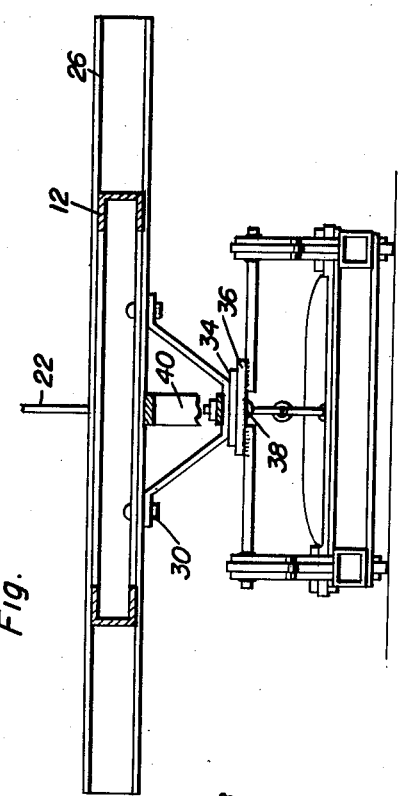
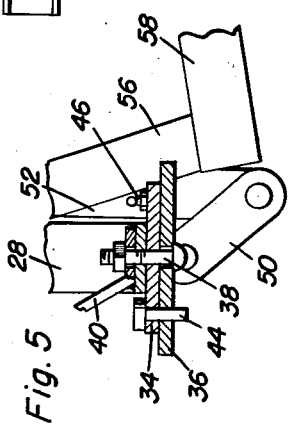
Oliver J. St. Denis
INVENTOR.
BY *Thomas A. O'Brien*
*and Harvey B. Jackson*
Attorneys

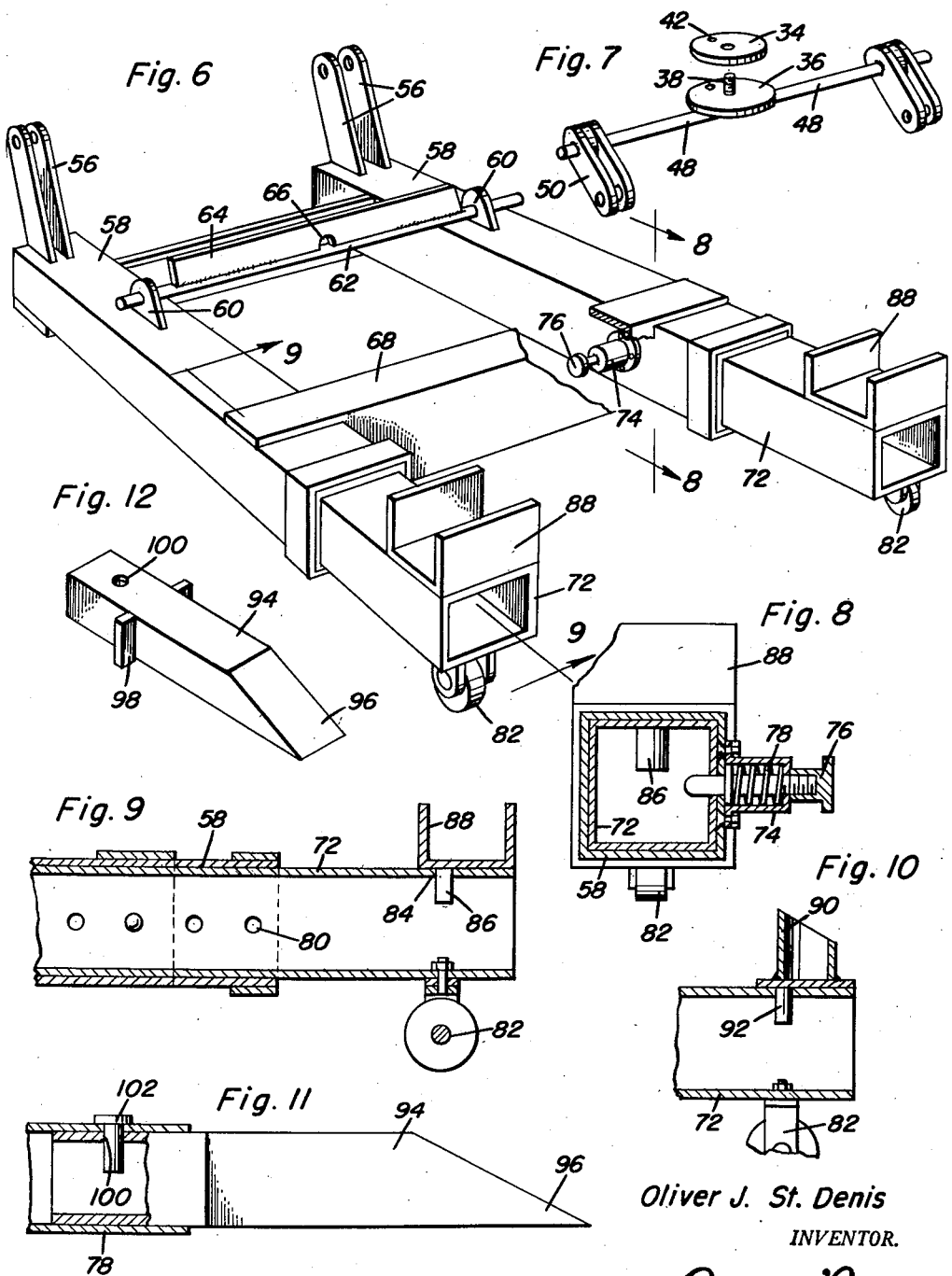

United States Patent Office 2,793,770
Patented May 28, 1957

2,793,770

FIFTH WHEEL WRECKER CRADLE

Oliver J. St. Denis, Eau Claire, Wis.

Application March 4, 1954, Serial No. 414,083

5 Claims. (Cl. 214—86)

This invention relates to a fifth wheel wrecker cradle and more specifically provides an attachment for a towing vehicle for engaging the undercarriage of a towed vehicle.

An object of this invention is to provide a fifth wheel wrecker cradle for attachment to a wrecker for the purpose of hauling damaged vehicles or machinery as becomes necessary.

Another object of this invention is to provide a wrecker cradle which extends from a fifth wheel secured to the undersurface of the frame of the rear of a wrecker vehicle.

A further object of this invention is to provide a wrecker cradle that is adapted to fit under the front or rear axle or frame of an automobile or other machinery.

A still further object of this invention is to provide a wrecker cradle which automatically retains the towed vehicle in alignment with the wrecker vehicle and eliminates the usual forward and backward swinging motion of the towed vehicle during the towing operation.

Yet another object of this invention is to provide a wrecker cradle mounted on a fifth wheel thereby enabling the cradle to turn in either direction and provided with a locking pin for retaining the wrecker cradle in adjusted position.

Still another important object of this invention is to provide a wrecker cradle having adjustable arms which may be locked in adjusted position and provided with adjustable frame engaging members on the rear of the adjustable arms.

Another outstanding feature of the present invention includes its simplicity and ruggedness of construction, its ease of operation, its universal adaptability, its safety and economic manufacturing costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view showing the wrecker cradle of the present invention in its at rest position;

Figure 2 is a side elevational view similar to Figure 1 showing the wrecker cradle in elevated position;

Figure 3 is a top plan view with a portion of the wrecker frame broken away, showing the details of construction of the cradle;

Figure 4 is a vertical section taken substantially along section line 4—4 of Figure 1 showing the details of construction of the wrecker cradle;

Figure 5 is a detail section taken substantially through the center line of the fifth wheel member;

Figure 6 is a perspective view showing the details of the wrecker cradle and the adjustable arms forming the cradle;

Figure 7 is a detail perspective view showing the pivotal link and the connecting arm for securing the cradle to the fifth wheel;

Figure 8 is a detail section taken substantially along section line 8—8 of Figure 6 showing the details of construction of the telescopic arms forming the wrecker cradle;

Figure 9 is a vertical section taken substantially along section line 9—9 of Figure 6, showing the details of construction of the eccentrically mounted frame engaging member and the dolly wheel on the undersurface of the cradle arm;

Figure 10 is a detail section similar to Figure 9 showing a modified form of eccentrically mounted frame engaging member;

Figure 11 is a section similar to Figure 9 showing another modified form of vehicle engaging member; and Figure 12 is a perspective view showing the attachment utilized in Figure 11 for engaging material resting upon a supporting surface.

Referring now specifically to the drawings, it will be seen that the numeral 10 generally designates the fifth wheel wrecker cradle of the present invention for attachment to the rear portion of a towing vehicle frame 12. The vehicle frame 12 is provided with the usual rear traction wheel 14, a suitable winch 16, upstanding brace means 18 for supporting guide pulleys 20, thereby guiding a flexible cable 22 from the winch 16 to the wrecker cradle 10 and attached thereto by a suitable hook 24.

The wrecker cradle 10 generally includes a transverse beam 26 secured to the rear end of the frame member 12 and having a depending U-shaped bracket 28 secured thereto by suitable fastening means 30. Positioned on the web portion of the U-shaped bracket 28 is a circular plate 34 forming a fifth wheel for matching engagement with a circular plate 36 with the plates 34 and 36 having a vertical pin 38 positioned therethrough for assembling the plates in pivotal relation. A suitable brace member 40 is provided for connecting tthe web portion of the U-shaped bracket 28 to the bottom of the frame structure 12 of the towing vehicle such as a wrecker, thereby rigidly securing the fifth wheel plate 34 to the frame 12.

Each of the plates 34 and 38 is provided with alignable apertures 42 for selectively positioning a pin 44 therethrough for securing the plates 34 and 36 in angular position. Suitable grease fittings 46 are positioned on the upper plate member 34 and throughout the remainder of the structure as desired and as becomes necessary. Secured to the undersurface of the bottom plate 36 is a pair of rod members 48 extending outwardly from the center of the plate 36 and being rigidly secured to a pair of spaced lugs 50 adjacent each end of the rod members 48. A link member 52 is secured between the outer ends of the lugs 50 in pivotal relation by a suitable pivot pin 54, and the other end of the link 52 is pivotally received between a pair of upstanding lugs 56 positioned on the upper surface of a pair of rearwardly projecting arms 58 which form the wrecker cradle of the present invention.

As specifically shown in Figures 1 and 2, when the arms 58 are resting against a supporting surface, the links 52 assume a substantially horizontal position wherein the arms 58 move longitudinally rearwardly from the rod members 48. When the arm members 58 are raised to a position substantially as shown in Figure 2, the link 52 is positioned in substantially vertical position, thereby permitting no longitudinal movement of the arms 58, thereby precluding any swinging movement of a vehicle being towed by the wrecker cradle 10 of the present invention.

Referring now specifically to Figure 6, it will be seen that each of the rearwardly extending arms 58 is provided with an upstanding pivot lug 60 adjacent its center portion and a suitable lift bar 62 is pivotally positioned in the lugs 60 and extending across the distance between the arms 58. A centering lug 64 having an aperture 66 therein is positioned between the upstanding lugs 60 for automatically centering the hook 24 and the lifting force transmitted by the hook is directed from the center of the wrecker cradle 10. Suitable brace members 68 are provided between the arms 58 for rigidifying the arms 58 and forming a rugged and sturdy structure. It will be seen that the arms 58 are hollow and telescopically receive a tubular member 72. Each of the arms 58 is provided with a socket 74 having a pin 76 slidable therein and a compression coil spring 78 urges the pin 76 inwardly through an aperture in the side wall of the arm 58 into engagement with one of a plurality of spaced apertures 80, thereby providing an adjustment for the telescopic tubular member 72 in the arm 58. Each of the arms 58 is provided with the spring loaded pin 76 thereby providing an easy adjustment for the telescopic tubular member 72.

Positioned on the undersurface of the end of the tubular member 72 is a caster wheel 82 for facilitating the rearward movement of the arms 58 on a supporting surface extending under a vehicle or the like. Each of the arms 58 is provided with a suitable aperture 84 for receiving a depending pin 86 positioned eccentrically on a channel-shaped member 88 for engaging the front or rear axle of a vehicle or other machine. It will be noted that the pin 86 is secured eccentrically of the channel member 88 thereby providing an adjustment for the channel member 88 in order to engage various sizes and arrangements of vehicle axles.

As specifically illustrated in Figure 10, an upstanding tubular member 90 is provided with an eccentrically mounted pin 92 wherein the tubular member 90 is adapted to engage the apertures usually found in the A frame of the undercarriage of the front axles of vehicles, such as modern automobiles. The eccentric pin 92 permits adjustment of the upstanding tubular member, thereby permitting the device to be utilized with various types of automobiles wherein the particular arrangement of the A frame is different.

As specifically illustrated in Figures 11 and 12, it will be seen that an extension member 94 having a pointed forward end 96 and abutment flanges 98 in spaced relation to its rear portion and an aperture 100 receiving a pin 102 thereby locking the extension 94 to the tubular ends of the member 72. This device may be utilized for lifting vehicles or other machinery which are positioned very close to the ground or other supporting surfaces. It will be understood that the pointed end 96 will lift a vehicle or other machinery which is deposited on a supporting surface.

The operation of the device will be readily understood. With the cross-member 26 secured across the rear of the frame 12 and the depending brackets 28 and 40 supporting the upper fifth wheel plate 34 and the vertical pin 38 positioning the lower plate 36 thereon and the pin 44 positioned in selected apertures for locating the plates 34 and 36 in relation to each other, the wrecker cradle 10 of this invention may be swung about the vertical axis formed by the pin 38 to a position desired or necessary to perform the function. With the device in the position as shown in Figure 1, the rearwardly extending arms 58 are moved rearwardly under the vehicle axle and the vehicle axle is raised, substantially as shown in Figure 2, by winding the cable 22 about the winch 16 in an obvious manner. Obviously, the winch 16 may be driven by a power take-off from the vehicle or any other well known means. As the cradle 10 assumes the position shown in Figure 2, the links 52 assume a substantially vertical position, thereby precluding any movement of the arms 58 in relation to the frame 12 except a pivotal movement about the horizontal axis formed by the connection of the upstanding lugs 56 to the links 52. When desirable, the arms 58 may be adjusted by regulating the telescopic tubular member 72 by releasing the pin 76 against the action of spring 78 and then adjusting the tubular member 72 to the desired length and releasing the pin 76, wherein the spring 78 will return the pin 76 into a selected aperture 80 as desired.

It will be understood that the axle engaging members 88 or 90 may be adjusted about their respective pins 86 or 92 for adjusting the exact position of the engaging members 88 and 90. The members 88 are used specifically for raising the solid type axles or the vehicles having a substantial cross-member, and the device illustrated in Figure 10 is utilized in the modern type vehicles having the usual flexible front axle and the A frame having apertures therein forming the central axis of the usual coil springs. In utilizing the device as illustrated in Figures 11 and 12, it will be understood that the tapered end 96 will wedge itself under a damaged vehicle or other machinery which is resting on the ground, thereby lifting the machinery in order to permit the arms 58 to be positioned thereunder for lifting and carrying the vehicle or the like. It will be seen that the towed vehicle will at all times remain in a straight line condition in relation to the towing vehicle, and the particular arrangement of the link 52 together with the lugs 50 and 56 precludes any rearward and forward swinging motion as usually occurs in the flexible type lift wrecker vehicle.

Obviously, suitable grease fittings, such as that illustrated by the numeral 46, may be utilized on the fifth wheels and on all the pivot elements or wherever there is reason to reduce the friction and wear caused by the relative movement of moving parts. Also, it will be understood that the plates 34 and 36 may be locked in any angular position by providing suitable apertures which may be selectively alignable for receiving the locking pin 44.

It will be understood that the wrecker cradle of the present invention may be utilized on substantially all types of vehicles, regardless of the damaged condition thereof, and assures the efficient and safe towing of the damaged vehicle by the wrecker. Further, it will be seen that the wrecker cradle of the present invention may be easily removed from the towing vehicle by merely removing the vertical pin 38 which is in the form of a bolt. The rugged construction and the particular arrangement of the elements thereof form a very safe and economically produced attachment for wrecker vehicles, thereby saving time and energy of picking up and moving damaged vehicles or vehicles stranded for other reasons, such as mechanical failures. Obviously, the various elements of the present invention may be constructed of readily obtainable stock materials thereby enhancing the economic feasibility of the device.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A fifth wheel wrecker cradle comprising a bracket adapted to be secured to the rear of a vehicle frame in depending relation, a cradle pivotally secured to said bracket and extending rearwardly therefrom, means on the outer end of said cradle for engaging a vehicle, and means for raising and lowering the outer end of said cradle, said bracket being provided with a circular plate, said cradle being provided with a circular plate and a vertical pin pivotally securing said plates together, said raising and lowering means including a self-centering lift bar positioned on said cradle, and a flexible member secured thereto for attachment to a winch mounted on a towing vehicle.

2. A fifth wheel wrecker cradle comprising a bracket adapted to be secured to the rear of a vehicle frame in depending relation, said bracket being provided with a circular plate, a cradle provided with a circular plate adjacent to the plate on the bracket, a vertical pin securing said plates together through their axes, a pair of links connecting the cradle plate to the cradle providing longitudinal movement of said cradle when the cradle is raised and lowered, means on the outer end of said cradle for engaging a vehicle, and means for raising and lowering the outer end of said cradle.

3. In combination with a tow truck having a frame supported in part by a rear axle, a pair of flat disks horizontally positioned in registered, facing engagement with each other at approximately the level of the rear axle, one disk being rigidly fastened to the truck frame, a pin in the axes of the disks holding them in assembled, mutually rotatable relationship, and a lifting cradle mounted on the second disk and extending rearwardly therefrom, the mounting between the cradle and the second disk including means for raising and lowering the adjacent end of the cradle.

4. A fifth wheel wrecker cradle comprising two flat disks horizontally positioned and in facing engagement, a pin in the axes of the disks holding them in assembled, mutually rotatable relationship, an arm extending downwardly from each of two opposite sides of one of the disks, a link pivotally mounted at one end to each arm, and a cradle pivotally mounted along one side thereof to each of the other ends of the links.

5. A fifth wheel wrecker cradle comprising two flat disks horizontally positioned and in facing engagement, a pin in the axes of the disks holding them in assembled, mutually rotatable relationship, an arm extending downwardly from each of two opposite sides of one of the disks, a cradle pivotally mounted at one end to said arms, a pair of vertical holes in the outer end of the cradle, a plate having a downwardly directed pin seated in each hole, and an upwardly directed stud mounted on each plate off center to the axis of the downwardly directed pin.

References Cited in the file of this patent

UNITED STATES PATENTS

| | | |
|---|---|---|
| 1,517,547 | Ekberg | Dec. 2, 1924 |
| 1,739,364 | Lake | Dec. 10, 1929 |
| 1,794,148 | Collins | Feb. 24, 1931 |
| 2,045,793 | Pearson et al. | June 30, 1936 |
| 2,183,478 | Holmes et al. | Dec. 12, 1939 |
| 2,449,146 | Ryan | Sept. 14, 1948 |
| 2,481,223 | Johnson | Sept. 6, 1949 |
| 2,515,833 | Mueller | July 18, 1950 |